United States Patent
Farnham

[11] Patent Number: 5,899,229
[45] Date of Patent: May 4, 1999

[54] TORCH VALVE ASSEMBLY

[75] Inventor: Gilbert Roland Farnham, Sycamore, Ill.

[73] Assignee: Cooper Industries, Inc., Houston, Tex.

[21] Appl. No.: 08/686,401

[22] Filed: Jul. 25, 1996

[51] Int. Cl.$^6$ .................................................. F16K 5/00
[52] U.S. Cl. ...................... 137/614.2; 137/614.18; 251/218; 251/900; 431/255; 431/258
[58] Field of Search ................... 251/225, 90 D, 251/218; 137/614.18, 614.2, 543.23; 431/255, 258

[56] References Cited

U.S. PATENT DOCUMENTS

| | | | |
|---|---|---|---|
| 2,868,224 | 1/1959 | Karlsson et al. . | |
| 3,436,164 | 4/1969 | Deucher | 431/255 |
| 3,802,828 | 4/1974 | Mercer et al. | 431/255 |
| 4,526,532 | 7/1985 | Nelson | 431/255 |
| 4,597,732 | 7/1986 | Yoshinaga | 431/255 |
| 4,643,671 | 2/1987 | Yoshinaga | 431/255 |
| 4,804,324 | 2/1989 | Yoshinaga | 431/255 |
| 4,881,894 | 11/1989 | Chapin et al. | 431/255 |
| 5,123,837 | 6/1992 | Farnham et al. | 431/258 |
| 5,176,175 | 1/1993 | Farnham et al. | 137/614.18 |
| 5,725,198 | 3/1998 | Jandl et al. | 251/900 |

FOREIGN PATENT DOCUMENTS

| | | |
|---|---|---|
| 0415824 | 6/1991 | European Pat. Off. . |
| 2682853 | 5/1993 | France . |

*Primary Examiner*—A. Michael Chambers
*Attorney, Agent, or Firm*—Burns, Doane, Swecker & Mathis, L.L.P.

[57] ABSTRACT

A torch valve for pressurized fuel includes a valve body having a central, axial bore and a valve needle threadedly mounted in the bore for selectable axial positioning in the bore. A inlet portion of the bore forms an inlet connectable to a source of pressurized fuel. A second portion of the bore carries the valve needle. An outlet passage communicates with the bore at a point approximately where the second portion joins the first portion. The outlet passage extends laterally from the bore to open at an outlet orifice on the outer surface of the valve body. The outlet orifice includes means for attaching a torch and igniter assembly to the valve body. The needle includes a stem that terminates in a needle tip. An annular ridge extends from the stem spaced from the tip and defines a first groove between the ridge and stem. A second groove is formed in the stem spaced from the first groove. Each of the first and second grooves carries a resilient sealing ring. The second groove and ring seal the outlet passage from the ambient environment. By positioning the needle valve with the first groove and ring between the outlet passage and the inlet, the outlet is closed from the inlet. A spring and pin arrangement is coupled with the needle on the inlet side of the valve body to regulate the pressure of gas in the outlet passage.

9 Claims, 3 Drawing Sheets

TORCH VALVE ASSEMBLY

FIELD OF THE INVENTION

The invention is directed to a torch valve assembly for controlling a flow of gaseous fuel from a fuel source to a fuel consuming apparatus, such as a heating, brazing, cutting or welding torch.

BACKGROUND AND SUMMARY

Valves for controlling the flow of fuel in torches are described, for example, in U.S. Pat. No. 5,123,837 and U.S. Pat. No. 5,176,175. Typically, the primary shut off mechanism of such valves includes a valve needle tip making metal to metal contact with a valve seat formed in the valve body. The needle is threadedly connected to the valve body, and turning the needle advances the needle tip into contact with the valve seat. The last part of the movement which makes positive contact of the needle with the valve seat includes rotation of the needle tip against the valve body. A special lubricant is used on the contact surfaces of the needle and valve seat. Without the lubricant, galling of the surfaces of the valve seat and needle tip could occur. In addition, to ensure that the needle and valve seat form a reliable seal, the machining tolerances of these parts must be tightly controlled, which adds manufacturing expense.

The present invention provides an improved valve that eliminates these problems. A valve according to the present invention includes a valve body having a central, axial bore and a valve needle threadedly mounted in the bore for selectable axial positioning in the bore. A first or inlet portion of the bore includes an inlet connectable to a source of pressurized fuel. A second portion of the bore carries the valve needle. An outlet passage communicates with the bore at a point approximately where the second portion joins the first portion. The outlet passage extends laterally from the bore to open at an outlet orifice on the outer surface of the valve body. The outlet orifice includes means for attaching a torch and igniter assembly to the valve body.

According to the invention, the needle includes a stem that terminates in a needle tip. An annular ridge extends from the stem spaced from the tip and defines a first groove between the ridge and stem. A second groove is formed in the stem spaced from the first groove. Each of the first and second grooves carries a resilient sealing ring. The second groove and ring seal the bore from the ambient environment. By positioning the needle valve with the first groove and ring between the outlet passage and the inlet, the outlet is closed from the inlet. The needle may be moved toward the second end of the valve body to open the outlet passage to the inlet of the bore.

The seal according to the invention relies on contact between the resilient rings and the surface of the bore. The metal to metal contact and wear in conventional valves is thus avoided. Further, the sealing rings are inexpensive and easily replaced, if necessary.

According to another aspect of the invention, the outlet passage communicates with the bore at an outlet coupling portion having a first diameter. A sealing portion of the bore having a second diameter less that the first diameter extends from the outlet coupling portion toward the inlet. The outlet passage opens into the outlet coupling portion adjacent to a junction between the bore portions. In the closed position, the first groove and first resilient ring are positioned in the sealing portion with the ring in sealing engagement with a surface of the sealing portion of the bore.

According to another aspect of the invention, regulation of the pressure of gas in the outlet passage is achieved by a pin and spring arrangement disposed in the inlet portion of the bore. The inlet includes valve seat means. The pin includes a flange extending radially from the pin shaft. In a closed position, the flange engages the valve seat means of the valve body. The spring is disposed between the collar of the needle and the flange and biases the flange into the closed position. The spring force is adjusted according to the position of the needle in the bore, that is, as the needle is moved toward the inlet of the bore, the spring is compressed, thus increasing the spring force. As a result, increased gas pressure is required to overcome the spring force to allow gas to flow past the pin.

BRIEF DESCRIPTION OF THE DRAWINGS

The invention may be better understood through the following description in conjunction with the appended drawings, in which.

DETAILED DESCRIPTION

Figure 1:
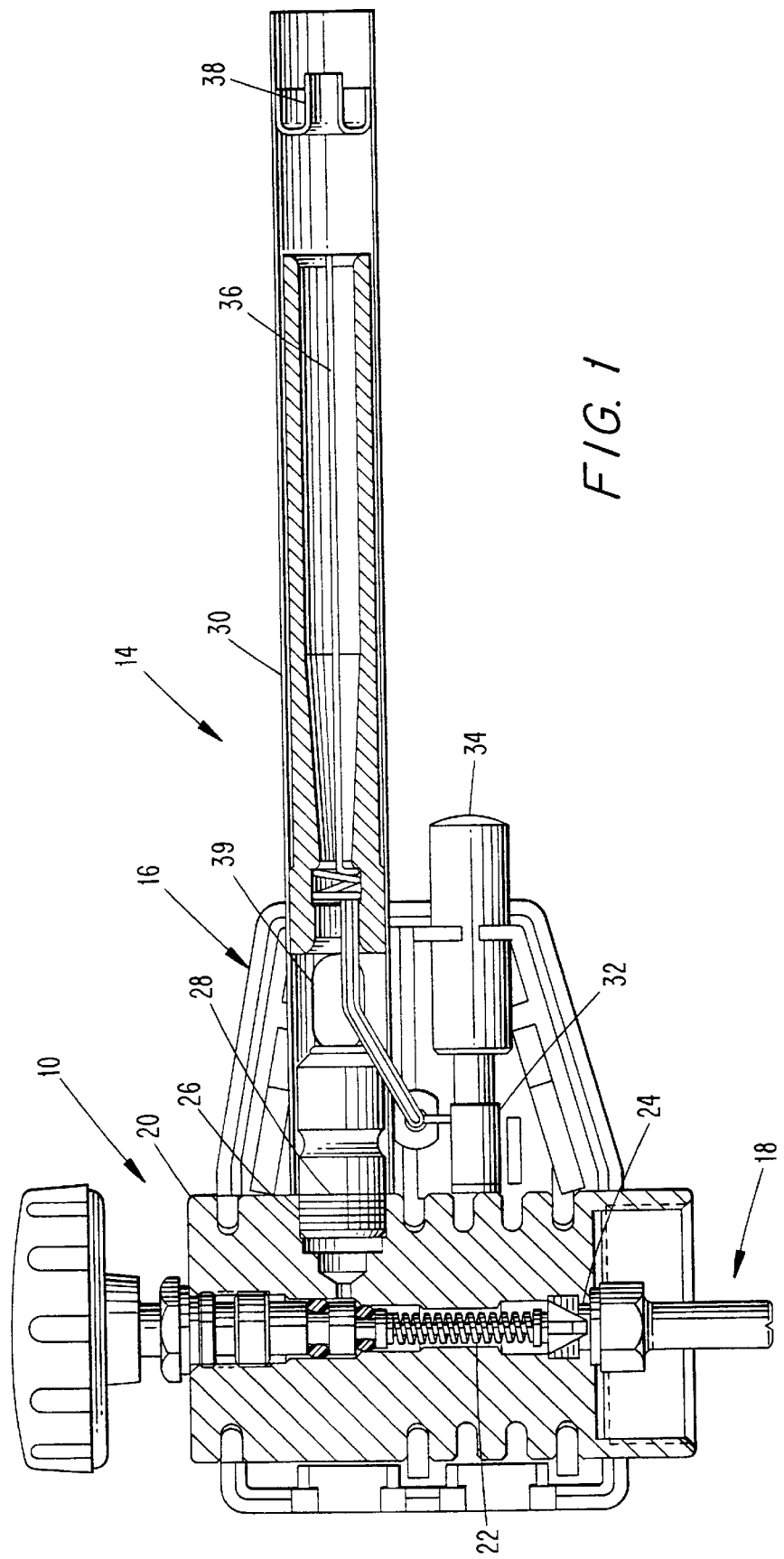
FIG. 1 is a sectional view of a torch assembly including a valve in accordance with the invention.

FIG. 1 shows a sectional view of a torch assembly in accordance with the invention. The assembly includes a valve assembly 10, a torch 14, a housing 16, and coupling means including a pusher pin 16 for coupling the valve to a source of pressurized gas, for example, a gas bottle or canister (not illustrated).

The valve assembly 10 includes a valve body 20 having a bore 22 extending axially through the valve body. The bore 22 includes an inlet 24 at an inlet end of the valve body 20 through which pressurized gas enters the valve body. An outlet passage 26 extends laterally through the valve body 20 from the bore 22 and includes an outlet orifice 28 on an outer surface of the body. Pressurized gas entering the valve body 20 flows from the inlet 24 through the bore 22 and the outlet passage 26 and out of the outlet orifice 28.

The torch 14 includes a tube 30 attached to the valve body 20 at the outlet orifice 28. The tube 30 illustrated in FIG. 1 is threaded and engages threads in the outlet orifice 28. The torch 14 has an igniter 32 and a push button 34 to activate the igniter. The igniter 32 and button 34 are supported by the housing 16. An electrode 36 extends from the igniter 16 into the tube 30. Gas flowing through the tube 30 mixes with air drawn in through holes 39 in the tube and the mixture is ignited at the tip of the electrode 36 and a flame forms at the end of the tube. A similar igniter and electrode arrangement is described in U.S. Pat. No. 5,123,837. A flame holder 38 disposed at the end of the tube 30 helps to stabilize the flame.

Figure 2:
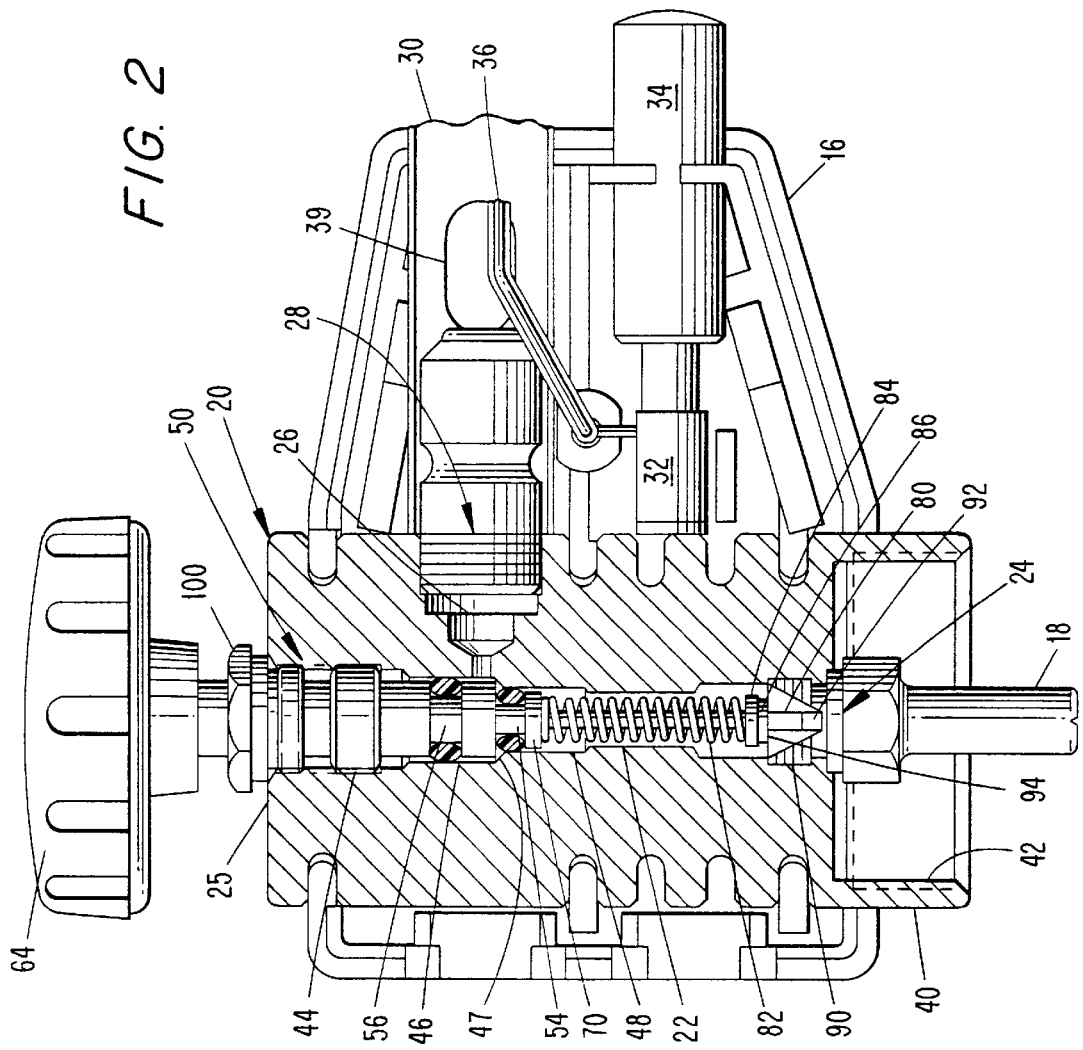
FIG. 2 is an enlarged view of the torch valve of FIG. 1.

The valve body 20 is shown enlarged in FIG. 2, with the flame tube 30 broken away. The bore 22 extends through the valve body 20 from the inlet 24 to an opposite end 25. At the inlet 24, the valve body 20 has a collar 40 with a threaded interior wall 42 for mounting the valve body to a source of compressed gas. The pusher pin 18 is threadedly mounted in the bore 22.

The bore 22 is shaped with an outlet coupling portion 46 having a first diameter, and a sealing portion 48 having a second diameter less than the first diameter. A chamfered portion 47 forms the junction between the outlet portion 46 and the sealing portion 48. The outlet passage 26 communicates with the outlet coupling portion 46 adjacent to the chamfer 47.

A valve needle 50 is disposed in the bore 22 and forms a valve control means in cooperation with the outlet coupling portion 46 and sealing portion 48 of the bore 22. The needle 50 is illustrated separately in FIG. 3. The needle 50 includes a stem 52 having a first groove 54 and a second groove 56 formed circumferentially thereon and spaced apart. A stem tip 58 extends from the stem 52. The needle 50 includes a threaded flange 60 that mates with a threaded portion 44 of the bore 22. A head 62 of the needle 50 extends out from the end 25 of the valve body 20. The head 62 of the needle 50 is splined to secure the needle to a handle 64. The needle 50 may be advanced toward the inlet 24 or retracted away from the inlet by turning the handle 64 in an appropriate direction to move the needle 50 in the threaded portion 44 of the bore 22, as may be readily understood.

The tip 58 of the needle 50 is formed on an inlet-directed end of the needle. An annular ridge 70 in the needle 50 is spaced from the tip 58 and borders the first groove 54. According to the illustrated embodiment, the annular ridge 70 has a diameter less than a diameter of the stem 52. A first ring 72 of resilient material, or o-ring, is disposed in the first groove 54 and a second ring 74 of resilient material, or o-ring, is disposed in the second groove 56. The second groove 56 and ring 74 are located on the stem 52 opposite the inlet side of the valve body 20. The second ring 74 is in continual contact with the wall of the bore 22 to seal the outlet passage 26 from the ambient environment.

The flow connection between the inlet 24 and the outlet passage 26 is controlled by selective positioning of the needle 50. Referring to FIG. 2, by positioning the needle 50 so that the first groove 54 is between the outlet passage 26 and the inlet 24, the o-ring 72 is forced into contact with the inner surface of the bore 22 in the sealing portion 48 to seal the outlet passage 26 from the inlet 24. In this closed position of the needle 50, the first groove 54 and o-ring 72 are disposed in the sealing portion 48 of the bore 22, which, being of smaller diameter than the coupling portion 46, compresses the o-ring 72. The chamfer 48 helps to guide the first o-ring 72 into the sealing portion 48 of the bore 22. To open the valve, the needle 50 is moved away from the inlet 24, so that the first groove 54 and o-ring 72 move into the outlet coupling portion 46 of the bore 22, which causes a space to open around the o-ring to open the inlet 24 to the outlet passage 26. The needle 50 may be moved to position the first o-ring 72 entirely within the coupling passage 46 of the bore for a maximal valve opening. The needle 50 and outlet coupling portion 46 are configured for approximately three full rotations of the needle between the closed position and a fully open position, which includes approximately one full rotation from an initially open position to the fully open position. This range of movement of the needle provides more precise control of the flow through the valve.

A pin 80 and spring 82 arrangement disposed in the inlet end of the bore 22 moderate the gas pressure in the outlet passage 26. A similar arrangement is disclosed in greater detail in U.S. Pat. No. 5,176,175 and reference is made thereto. The pin 80 has an elongated body and includes a flange 84 extending radially outward. A gasket 86 is disposed on the face of the flange 84 facing the inlet 24. The inlet 24 includes valve seat means 90 to engage the pin 80 and flange 84 to close the inlet 24. The spring 82 is held between the annular ridge 70 and flange 84 to bias the pin 80 against the valve seat means 90. The spring force may be overcome by pressure of the gas in the gas source to allow the pin 80 to move to open the inlet valve seat 90. The spring 80 may be selected to have a spring constant appropriate for the gas source. The spring force is adjusted by the position of the needle 50 relative the inlet 24. This arrangement provides automatic adjustment for pressure variations in the gas source to maintain a constant pressure in the outlet passage 26.

In the illustrated embodiment, the valve seat means 90 is formed in the push pin 18, which includes a hole 92 to receive the pin 80 and a surface 94 to mate with the flange 84 and gasket 86.

Figure 3:
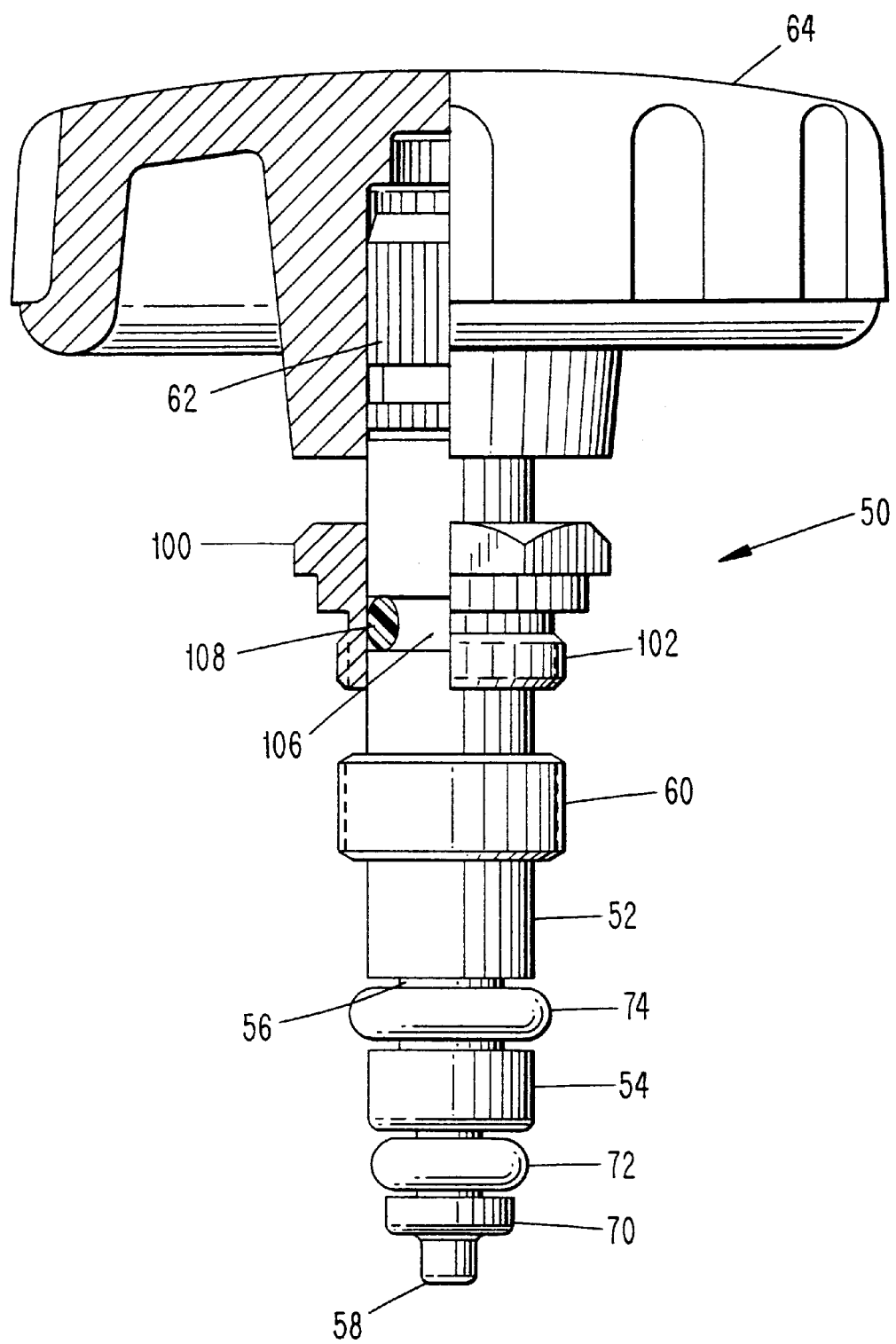
FIG. 3 is a view of a valve needle of FIG. 1 and FIG. 2.

A stop nut 100 is fastened in the bore 22 by screw threads 102 and supports the needle 50 at the end 25 of the valve body 20. The stop nut 100 serves to limit the movement of the needle 50 away from the inlet 24 to prevent the needle from dislocating from the threaded portion 44 of the bore 22. As seen in FIG. 3, the needle 50 includes a sealing groove 106 in the portion of the needle carried in the stop nut 62. A sealing ring of resilient material 108 resides in the sealing groove 106 to form a secondary seal between the ambient environment and the interior of the valve body 20.

The invention has been described in terms of preferred embodiments, principles and modes of operation. The invention should not be construed as limited to the particular embodiments described. Instead, the above-described embodiments should be regarded as illustrative and not restrictive, and variations, changes and equivalents may be made by others without departing from the scope of the invention as defined by the following claims.

I claim:

1. A valve for regulating a flow of pressurized fuel, comprising:

a valve body having an axial bore forming an inlet for pressurized fuel formed at an inlet end of the valve body, and having an outlet passage communicating with the bore and extending laterally from the bore and including an outlet orifice on an outer surface of the valve body;

a needle movably disposed in the bore, the needle having a stem, a tip extending from the stem, and an annular ridge adjacent the tip and defining a first circumferential groove between the ridge and stem, and having a second circumferential groove formed in the stem spaced from the first groove;

a first resilient ring disposed in the first groove;

a second resilient ring disposed in the second groove;

means for positioning the needle in the bore in a selectable axial position in a range including a closed position with the first groove positioned between the outlet passage and the inlet and an open position with the first groove moved away from the inlet end of the bore a distance sufficient to open the inlet of the bore to the outlet passage; and means for automatically regulating a pressure of gas in the outlet passage when the needle is in an open position.

2. The valve as claimed in claim 1, wherein the outlet passage communicates with an outlet coupling portion of the bore having a first diameter, the bore having a sealing portion adjacent the outlet coupling portion having a second diameter less than the first diameter and extending toward the inlet, a chamfer connecting the outlet coupling portion to the sealing portion, the first groove and first ring being positionable in the sealing portion with the first ring in contact with an inner surface of the sealing portion in the closed position of the needle.

3. The valve as claimed in claim 2, wherein movement of the needle toward the inlet end permits the second ring to separate from the inner wall of the sealing portion.

4. The valve as claimed in claim 1, wherein said means for selectably positioning the needle comprises a screw-threaded portion formed on the needle and mating threads formed on the valve body to engage the threaded portion of the needle.

5. The valve as claimed in claim 1, further comprising means to connect the outlet orifice to a torch.

6. The valve as claimed in claim 1, further comprising means to connect the inlet to a source of pressurized fuel.

7. The valve as claimed in claim 1, wherein the means for automatically regulating a pressure of gas comprises:

valve seat means in the inlet;

a pin having a flange disposed in the first portion of the bore; and, a spring disposed in the first portion of the bore and engaging the needle collar and the pin flange to bias the flange against the valve seat means.

8. The valve as claimed in claim 7, wherein said valve seat means comprises an element mounted in the inlet and having a face to mate with the flange of the pin and a passage into which the pin is insertable.

9. The valve as claimed in claim 8, wherein the element is a pusher pin which extends outward from the valve body for coupling the valve with a source of pressurized fuel.

* * * * *